Figure 1:
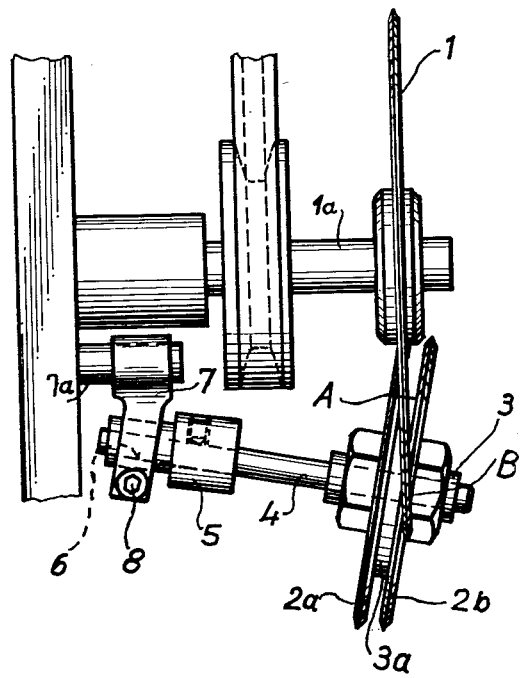

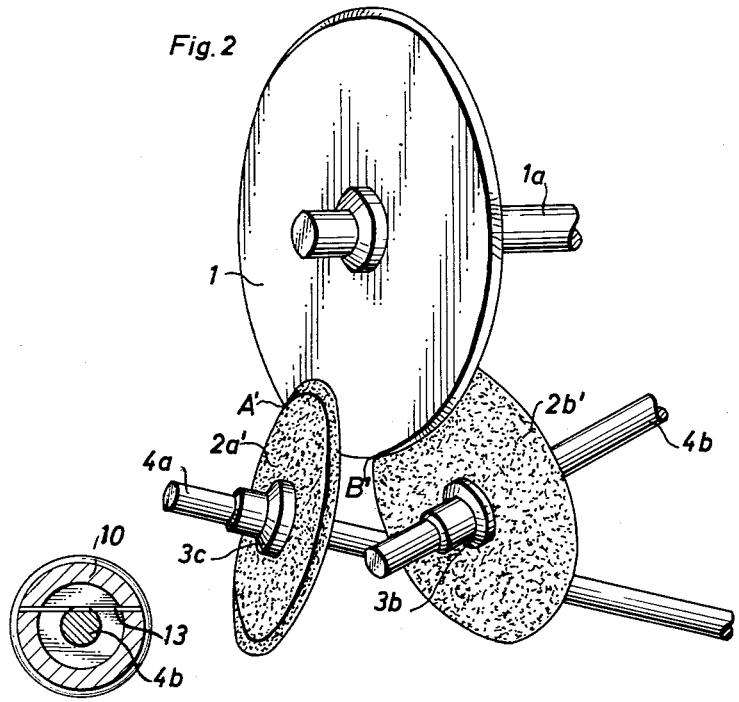
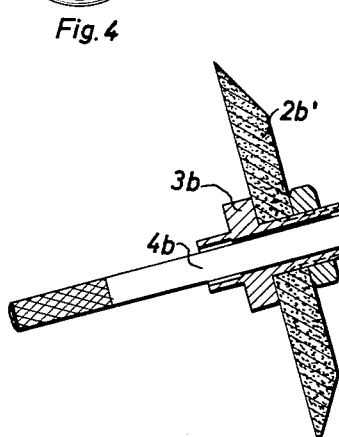
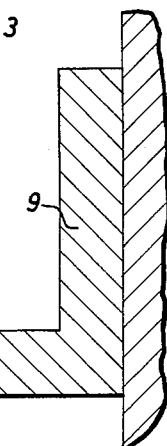

3,010,261
MACHINES FOR CUTTING CIGARETTES, CIGARILLOS, FILTER COMPONENTS OR THE LIKE HAVING A ROTARY CUTTER AND A GRINDER THEREFOR
Willy Rudszinat and Bernhard Schubert, Hamburg-Lohbrugge, Germany, assignors to Hauni-Werke Korber & Co., K.G., Hamburg-Bergedorf, Germany
Filed May 20, 1959, Ser. No. 819,799
Claims priority, application Germany May 24, 1958
4 Claims. (Cl. 51—248)

The invention relates to improvements in machines for cutting cigarettes, cigarillos, filter components or the like, and is particularly concerned with a grinding device for such machines in which cigarettes, cigarillos, filter components or the like are cut by means of rotating cutters, particularly circular cutters. Such cutters are generally constantly ground by means of two positively driven grinding wheels which operate on the cutter from both sides. It is also known to fasten these two grinding wheels spaced one from the other on a shaft and to position this shaft obliquely to the cutter so that the two grinding wheels operate on the two sides of the cutter. In this case the grinding wheels must be displaced to allow for adjustment due to wear of the cutter and this generally results in the cutter being ground only on one side or at least ground to a greater extent on one side. Moreover, it is difficult to position the cutter so accurately that both sides of the cutter are ground absolutely uniformly.

One object of the invention is to avoid this disadvantage while completely eliminating the positive drive for the grinding wheels by the fact that the grinding wheels are fastened on a bearing sleeve for the purpose of automatic positioning relatively to the cutter, which sleeve is freely rotatable and slidable on a spindle, so as to adopt automatically a correct grinding position to secure uniform grinding of the two faces.

Thereby the result is obtained that the grinding wheels adjust themselves automatically by reason of their freedom for axial displacement so that both grinding wheels always necessarily operate with the same pressure on the cutter. It is, however, necessary to adjust the grinding wheels progressively according to their wear, and, moreover, the shaft should be positioned accurately in a horizontal plane so that the grinding wheels are not subject to gravity effects.

Another object is to provide a grinding device, in which all horizontal adjustment is eliminated by the fact that each grinding wheel is supported on its own shaft inclined to the horizontal. Thereby the great advantage is obtained that re-adjustment of the grinding wheels for compensating for wear is not necessary at the comparatively small time periods required in the previously known arrangements (approximately every half-hour). The grinding wheels slide downwardly according to the amount of wear and hence a substantial part of the thickness of the grinding wheels can be worn away before re-adjustment is necessary as a result in the reduction of the effective diameter. In consequence re-adjustment is only necessary at comparatively infrequent intervals (say 10 to 14 days), even if it is not preferred to avoid all re-adjustment and to replace the grinding wheels when worn at pre-determined time intervals.

If cylindrical cap wheels are used there is no reduction in the effective diameter so that throughout the useful life of such wheels no re-adjustment whatever is necessary.

The continuous supervision of the grinding device which was previously necessary is thus reduced to a minimum. This is particularly advantageous in multiple filter machines in which filter rods are assembled from different types of filter rod sections, and, therefore, numerous circular cutters are involved for cutting the multiple filter rod sections into filter rods or plugs, all of which require continuous supervision. If, for example, it is found that the cut is no longer satisfactory, heretofore it has been necessary to readjust the grinding wheels. Obviously it frequently happens in certain circumstances, because the attendants have other necessary tasks, that the adjustment is not effected in good time, whereby as a result of the no longer satisfactory cutting some flattening of the rods occurs. The resulting rods or plugs are then the cause of consequential and often extremely serious disturbances in the machine operation since in this type of disturbance not only are the filter rods assembled from such disturbed rod components or plugs useless, but also as a result of the soiling of the grooves of the rolling or winding devices various parts of the whole machine become covered with adhesive and the machine therefore has to be put out of production for a long time.

Since it is desirable to adjust the grinding pressure to the various conditions as regards the material of the cutter and of the grinding wheels, according to further objects of the invention the shafts are supported in a pivotal and adjustable manner, for example in a ball joint. For easy exchange of the grinding wheels a bore is provided in the ball head of the ball joint into which the spindle can be inserted and retained, for example by means of a spring catch.

Two constructional examples of the invention are shown by way of example on the accompanying drawing wherein:

FIG. 1 shows a grinding device in plan in which the two grinding wheels are arranged on a common shaft, FIG. 2 shows a grinding device in which a separate shaft is provided for each grinding wheel, FIG. 3 shows a ball joint in longitudinal section and on an enlarged scale, and FIG. 4 shows the ball joint in cross-section.

The cutting and grinding device shown is intended to be applied to a well-known machine for cutting cigarettes, filter rods or the like in the production of such like articles, and it has not been deemed necessary to show such machine since the manner in which it operates for cutting the specified articles is well known to those interested in this art.

The device shown in FIG. 1 consists of a rotating circular cutter 1 supported on a shaft 1a, and grinding wheels 2a and 2b arranged obliquely to the cutter 1 at an angle corresponding to the cutting face angle of the cutter 1, the grinding wheels being fastened to a bearing sleeve 3. It will be assumed that the cutter 1 has a substantially horizontal axis. The bearing sleeve 3 is provided with a spacing flange 3a and is freely rotatable on a shaft 4 which lies in a horizontal plane. The shaft 4 is fastened in a bore 6 drilled slightly obliquely in the bushing 5. The bushing 5 is of two-part or split construction at one end and is rotatable in a two-part or split holder 7 carried by a stub shaft 7a fixed to a bearing part for the shaft 1a. The bushing 5 can thus be fastened in the holder 7 in any desired rotary and axial position by tightening the screw 8.

The device operates as follows:

The rotating circular knife 1 drives the two grinding wheels 2a and 2b located on each side of the cutter respectively. These grinding wheels 2a and 2b are moved in the direction towards the circular knife 1 by adjustment of the bushing 5 or of the holder 7 on the stub shaft 7a in a direction parallel to the shaft 1a, or by movement of the stub shaft 7a itself, and are set to the desired position and/or re-adjusted when the cutter 1 is worn down. The circular cutter 1 engages the grinding wheel 2a at the point A and the grinding wheel 2b at the point B.

The grinding wheels 2a and 2b are driven by the friction resulting from engagement with the cutter 1, but, due to friction and other effects, not at the very high rotary speed of the cutter 1, so that the latter is ground satisfactorily by the rotation of the grinding wheels 2a and 2b as a result of the difference in speed between them and the cutter 1. Since the sleeve 3 is freely rotatable and slidable on the shaft 4 the grinding wheels 2a and 2b adjust themselves automatically relatively to the cutter 1 so that both sides of the cutter are uniformly ground. In all cases the axis of the shaft 4 must run horizontally in order that the cutter 1 is not subject to a greater pressure on one side than on the other and consequently ground in a non-uniform manner. If for any reason the axis of the cutter shaft 1a deviates slightly from the horizontal, it is nevertheless possible by slightly rotating the bushing 5, to adjust the shaft 4 to be precisely horizontal and thus to secure the balanced pressure condition between the grinding wheels and the cutter so that the latter is ground absolutely uniformly on its two sides.

The device for grinding the rotary cutter 1 shown in FIGS. 2 to 4 consists of two grinding wheels 2a' and 2b' arranged obliquely to the axis of the cutter 1 and which are mounted on bearing sleeves 3b and 3c. The bearing sleeves 3b and 3c are freely rotatable on spindles 4a and 4b suitably inclined to the horizontal so as to bring the operative grinding faces of the wheels into correct grinding position relatively to the edge of the cutter 1 so as to obtain the required shape of the cutting edge as a result of the grinding operations, and so that the grinding wheels exerting their cutting action as a result of the gravity forces acting on them. The grinding wheels 2a' and 2b' engage different points of the periphery of the circular cutter 1. The inclination of spindles 4a and 4b is chosen according to the desired grinding pressure. If merely inclination to the horizontal does not give the required grinding angle the spindles may be additionally inclined as seen in plan relatively to the axis of the shaft 1a.

If desired the spindles 4a and 4b are fixedly connected to the machine frame in the simplest constructional form of this embodiment of the invention; preferably, however, the grinding device is constructed as shown in FIG. 3 so as to permit adjustment of the inclination wherein a U-shaped holder 9 secured to the machine frame, carrying a conical holder 9a for a ball head 10. This holder 9a, the ball head 10 and a clamp member 11 form a ball joint in which the ball head 10 can be displaced in all directions and retained by means of screws 12. The sleeve 3b is rotatable and slidable on the spindle 4b and the grinding wheel 2b' engaging the cutter 1 is mounted thereon. The spindle 4b is inserted into a bore 10a in the ball head 10 and is retained in this bore by means of a spring holding wire 13 (see also FIG. 4). By this arrangement of the device the spindle 4b can be readily removed for changing the grinding wheel, but without altering the angle of the spindle 4b when re-inserted.

The device according to FIGS. 2 to 4 operates as follows:

The rotating circular cutter 1 drives the two grinding wheels 2a', 2b' by its engagement with them. The circular cutter engages the grinding wheel 2a' at the point A' and the grinding wheel 2b' engages the opposite side of the cutter at the point B'. The friction produced drives the grinding wheels 2a' and 2b', but at a smaller speed due to friction, windage and so on. The cutter 1 is satisfactorily ground by the difference in speed between the cutter 1 and the grinding wheels 2a' and 2b'. By the horizontal component of the inclination of the spindles 4a and 4b the sleeves 3b and 3c exert their cutting feed by the action of gravity and they move downwardly towards the circular cutter 1 automatically as the grinding wheels become worn. The grinding pressure always, therefore, remains the same since the reduction in weight of the grinding wheels as the result of wear can be neglected.

What we claim is:

1. A rotary cutter grinding device in which the rotary cutter rotates on a fixed axis, comprising an adjusting sleeve, a clamping bracket for holding said adjusting sleeve adjacent said rotary cutter, said adjusting sleeve being provided with a bore extending obliquely with respect to the longitudinal axis thereof, a spindle having one end mounted in said bore, a sleeve mounted on the opposite end of said spindle for rotary and free sliding axial movement thereon, a pair of grinding wheels mounted on said sleeve in mutually spaced apart relation having their edges presented to the side edges of the rotary cutter and said clamping bracket being split and provided with a clamping member to clamp said adjusting sleeve in various angular positions to permit the spindle to be positioned so that the spindle axis extends obliquely to the cutter axis.

2. A rotary grinding device for rotary cutters in which the rotary cutter is provided with a fixed axis of rotation, comprising a clamping bracket mounted adjacent the rotary cutter, a ball head supported by said clamping bracket, there being a clamping bracket arranged on both sides of said rotary cutter, a spindle having one end mounted in said ball head, the other ends of said spindles being presented in a direction toward said rotary cutter, a sleeve rotatably mounted adjacent the free end of the spindle and arranged for longitudinal sliding movement thereon, a grinding disc mounted on each sleeve and presented with the edges adjacent the opposed cutting edges of said cutter, and clamping elements on said clamping bracket to lock said ball head in an adjusted position so that said grinding discs may be presented at different angles to the opposed side edges of said rotary cutter.

3. A rotary cutter grinding device according to claim 2 in which each spindle is received in a bore in its corresponding ball head and a locking ring carried thereby engages within a groove in the end of the spindle to removably hold said spindle in place.

4. A rotary cutter grinding device according to claim 3 wherein said grinding wheels are of cap-shape.

References Cited in the file of this patent

UNITED STATES PATENTS

| | | |
|---|---|---|
| 528,217 | Wolf | Oct. 30, 1894 |
| 920,010 | Bogdanffy | Apr. 27, 1909 |
| 1,051,646 | Stukart | Jan. 28, 1913 |
| 1,341,699 | Fawistowski | June 1, 1920 |
| 1,424,875 | Braun | Aug. 8, 1922 |
| 1,780,868 | Coulson | Nov. 4, 1930 |
| 1,918,575 | Van Berkel | July 8, 1933 |
| 1,957,776 | Gury | May 8, 1934 |
| 2,069,431 | Waage | Feb. 2, 1937 |
| 2,632,289 | Ditting | Mar. 24, 1953 |

FOREIGN PATENTS

| | | |
|---|---|---|
| 276,470 | Great Britain | Sept. 1, 1927 |